March 10, 1970  B. M. BARTILSON ETAL  3,499,588
PLASTIC CONTAINER TOP WITH COMBINATION CLOSURE AND SPRINKLER
Filed Nov. 25, 1968  3 Sheets-Sheet 1
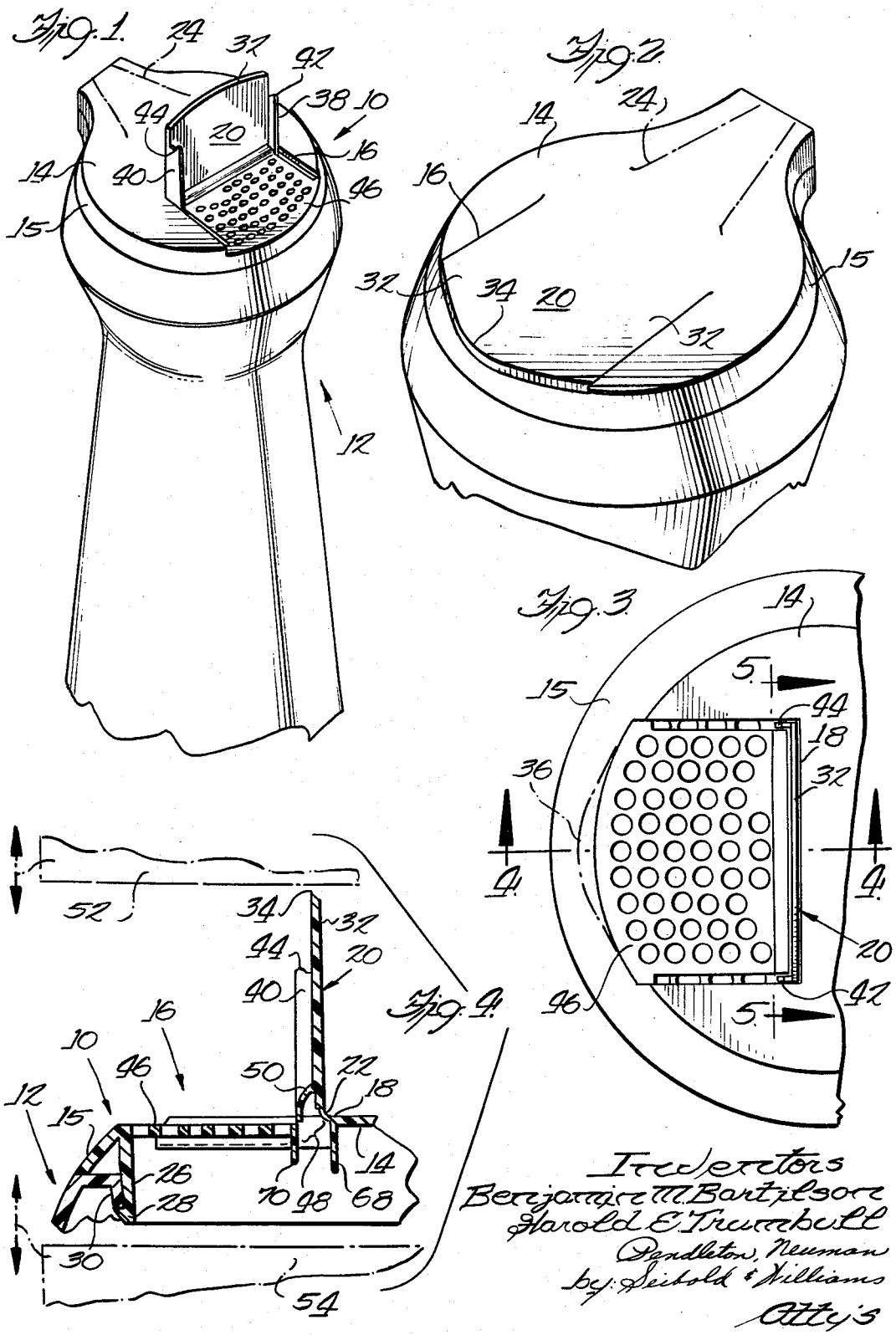
Inventors
Benjamin M. Bartilson
Harold E. Trumbull
Pendleton, Neuman
by Seibold & Williams
Atty's March 10, 1970     B. M. BARTILSON ETAL     3,499,588
PLASTIC CONTAINER TOP WITH COMBINATION CLOSURE AND SPRINKLER
Filed Nov. 25, 1968     3 Sheets-Sheet 2
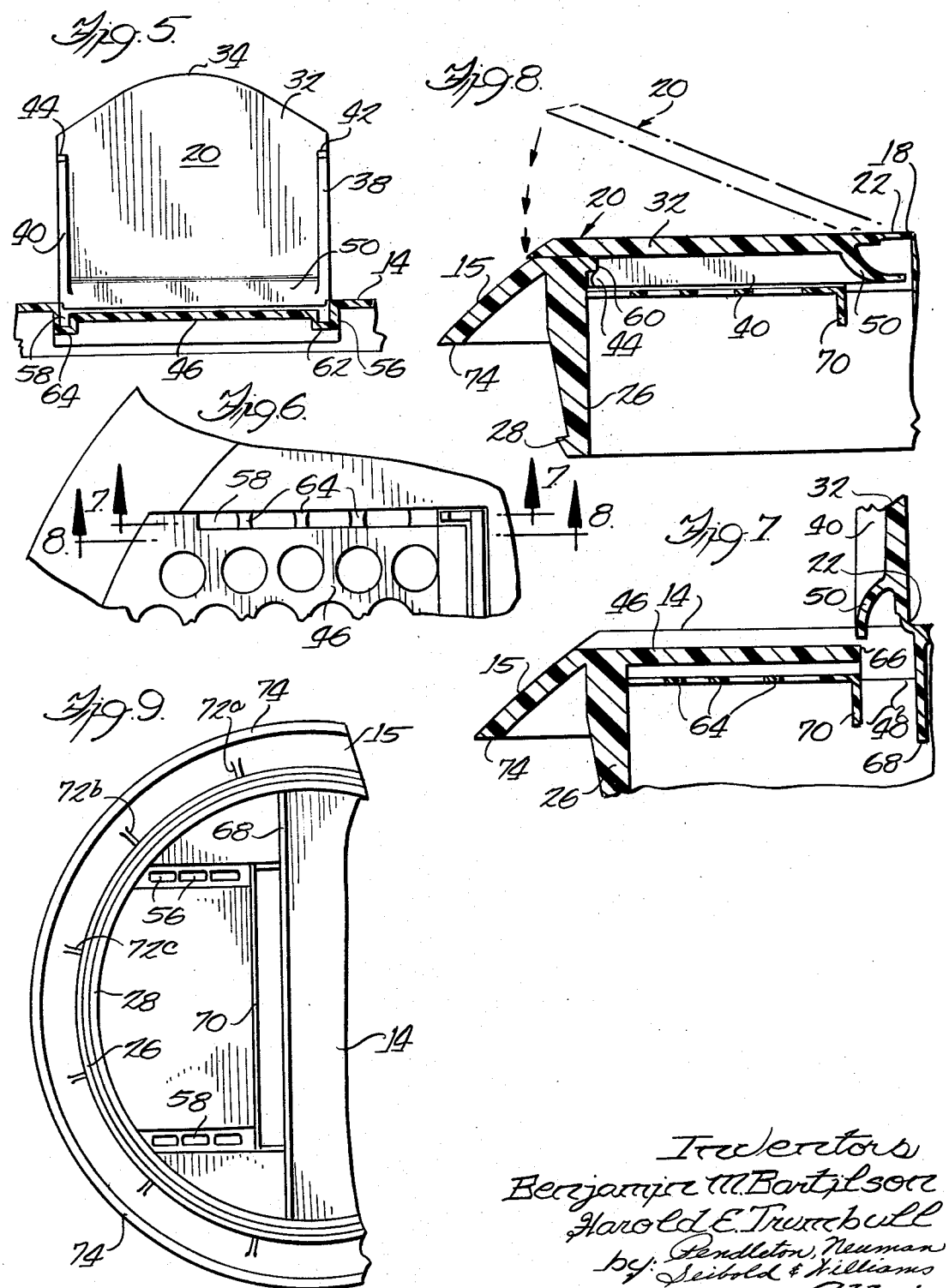

March 10, 1970　　B. M. BARTILSON ETAL　　3,499,588
PLASTIC CONTAINER TOP WITH COMBINATION CLOSURE AND SPRINKLER
Filed Nov. 25, 1968　　3 Sheets-Sheet 3
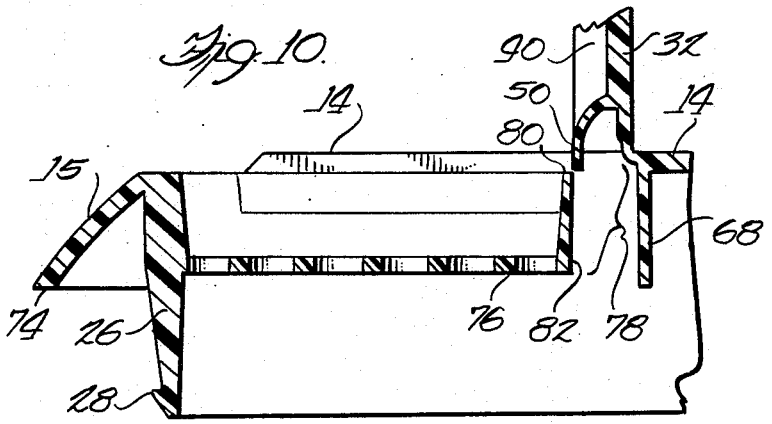
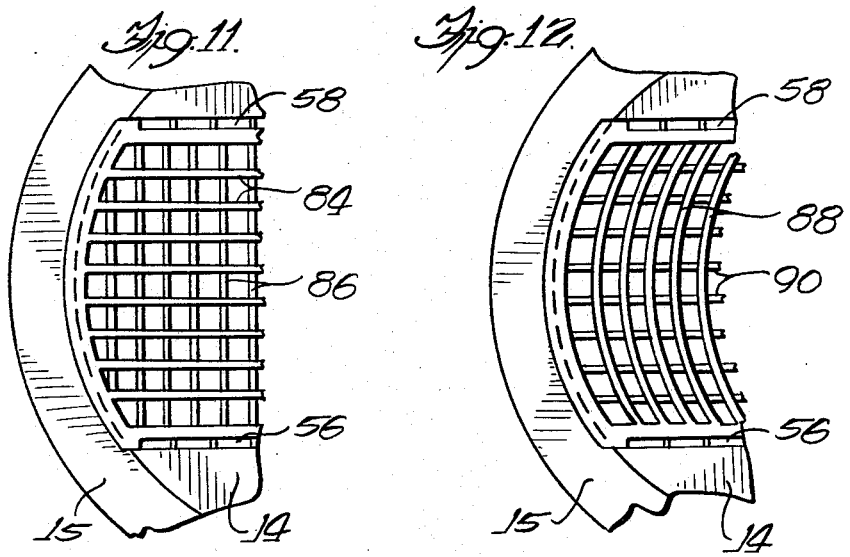
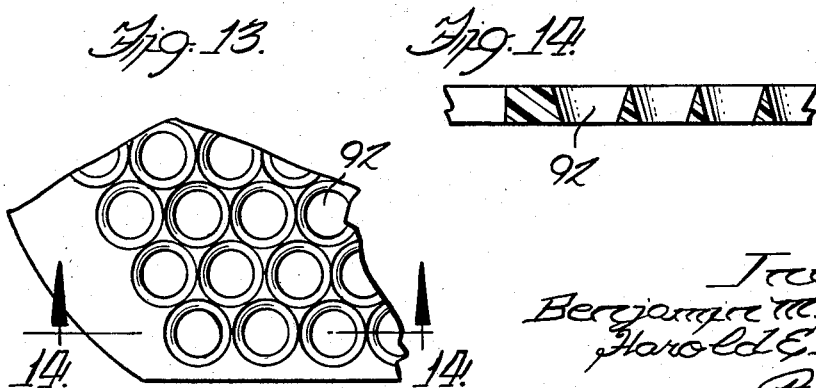
Inventors
Benjamin M. Bartilson
Harold E. Trumbull
Pendleton, Neuman
by Seibold & Williams
Atty's

United States Patent Office

3,499,588
Patented Mar. 10, 1970

3,499,588
PLASTIC CONTAINER TOP WITH COMBINATION
CLOSURE AND SPRINKLER
Benjamin M. Bartilson and Harold E. Trumbull, Columbus, Ohio, assignors to Morton International, Inc., Chicago, Ill., a corporation of Delaware
Filed Nov. 25, 1968, Ser. No. 778,562
Int. Cl. B65d 47/00; A47g 19/24
U.S. Cl. 222—556                                  10 Claims

ABSTRACT OF THE DISCLOSURE

This low-cost, one-piece integrally molded plastic container top for containers of particulate substances such as salt features a wall member having an opening with a hingedly-attached cover and a recessed perforated sprinkler plate across the opening. Access openings for mold parts adjacent the sprinkler plate are effectively sealed by a projecting curved surface on the cover adjacent the hinge portion, which curved surface cooperates with edge portions of the sprinkler plate.

BACKGROUND OF THE INVENTION

Field of the invention

The present invention relates to a plastic closure and sprinkler device for particulate materials and more specifically to a low-cost, one-piece, integrally molded closure and sprinkler which lends itself to production by conventional techniques, preferably injection molding with simple two-section opposed dies.

For convenience herein, the invention will be described with particular reference to salt (sodium chloride) sprinkler and closure devices. It should be understood, however, that the invention is not limited thereto and can be embodied in the form of a sprinkler device to a wide variety of materials, but, most advantageously, for particulate solids, e.g., various condiments in granular form, granular sugar, granular foodstuffs and other edible and non-edible granular substances.

Description of the prior art

The dispensing of particulate material, such as salt, presents a number of problems. Among these problems is the requirement of providing at extremely low cost a convenient, sanitary, stackable, attractive and structurally-sound package from which the salt can be dispensed selectively by pouring or sprinkling but which can be resealed after each use. The stringent cost limitation has led to efforts to mold one-piece snap-on container tops including resealable pouring spouts and sprinkler devices.

Such efforts have met with only limited success. For example, in one case, the resulting combination top did not present a substantially planar surface in the closed position for convenience of stacking, but instead employed upstanding nibs or projecting buttons for securing the closure. Another disadvantage arose from the fact that undesired spaces had to be included in the sprinkler plate for mold parts, thus presenting excessive sifting or bypass leakage problems and defeating the function of the foraminous sprinkler plate, e.g., fine sifting and the retention of undesired large particles. This shortcoming is particularly apparent when using small-diameter spaced perforations for extra-fine distribution of particles.

It is therefore an object of the present invention to provide a low-cost resealable sprinkler which is integrally molded as part of a container top and copes with these problems. It is a more specific object of the present invention to provide a low-cost, integrally molded closure and sprinkler which can be molded by simple two-section injection molding techniques. It is another object of the present invention to provide a low-cost closure and sprinkler combination which is free from projecting nibs and presents a planar top surface in the closed position for ease of stacking. It is still another object of the present invention to provide a closure and sprinkler combination which is free from undesired open areas on or adjacent the recessed sprinkler plate or grate. These and other objects of the present invention will become apparent as a detailed description proceeds.

SUMMARY OF THE INVENTION

In brief, these objects are achieved in a particular embodiment by a one-piece molded plastic closure and sprinkler which comprises a preferably-flat wall member having an opening with at least one straight side and securing means adjacent peripheral portions for attachment to a vessel such as a salt container. The securing means is preferably in the form of a snap fitting, e.g., depending flanges on the wall member with enlarged engageable surfaces adjacent the lower extremity which engage depending flanges on the open end of the container. The wall member is preferably reinforced for structural strength by transverse flanges or the like, e.g., depending transverse webs.

A cover for, and substantially registering with, the opening is integrally molded in an upstanding position (i.e., vertical with respect to the flat wall member) along the straight side by means of a thinned section whereby the cover can be hingedly flexed from the upstanding molded position to a preferably-coplanar closed position. The cover has means for releasably securing the cover in the closed position, e.g., depending side rails and outwardly-facing recessed detents, for engaging undersurfaces of edge portions of the opening. Edge portions of the cover preferably overhang the wall member in the closed position so as to facilitate digital opening of said cover.

A perforated sprinkler plate or sifter grate is integrally molded to the inner or undersurface of the flat wall member and extends substantially across the opening, but terminates spacedly from the straight side so as to provide an access space for mold parts associated with the lower extremity of the cover and the inner surfaces of the thinned hinge section.

The resulting access space, which is essential so that all surfaces are engageable by dual mold cavities and has heretofore resulted in undesired leakage, is sealed against excessive granular flow by an integrally molded projecting means adjacent the lower extremity of the cover and extending laterally athwart said access space to cooperate with edgewise portions on said perforated plate. This projecting means is in the form of a rolled or curved edge which maintains a minimum gap at the adjacent edge of the sprinkler grate at least when the cover is in the upright, open position and, preferably, substantially throughout the 90° arc of travel of the cover, that is, from the upright position to the coplanar closed position. Thus the flow of particulate materials is substantially limited to the apertures or perforations in the sprinkler grate.

The apertures in the sprinkler plate may have various configurations, including cylindrical, frustoconical (funnel shaped), rectilinear, combination curved and straight sided polygonal orifices and the like. The sprinkler plate itself may be substantially flush with the underside of the flat wall member or substantially recessed below said wall member. If recessed substantially, an upstanding edgewise flange may be used to cooperate with the projecting rolled edge of the cover to provide the desired seal.

Because of recognized advantages, the structure of the present invention is molded as a unitary structure in plastic. The selected plastic should be readily moldable by conventional low cost techniques and should preferably have high strength, reasonable resilience and sufficient body to maintain shape under normal usage. It should also be inert, free from objectionable odors, and should otherwise meet structural, sanitary and aesthetic requirements.

Suitable plastics may include, but are not limited to, polyethylenes, polypropylenes, polyamides, acetate-butyrate copolymers, polyvinyl chloride polymers and copolymers, polystyrene, and compatible combinations thereof, preferably polyethylenes and/or polypropylenes, which have what the art refers to as excellent "living hinge" properties. The plastic, particularly those with little tolerance to repeated flexure, may also contain necessary or desirable additives, such as dyes, plasticizers, extenders, and the like, as those skilled in the plastic molding art will recognize. In the specific embodiment hereinafter set forth, the container top is injection-molded from injection-molding grade, high-density polyethylene having a density of about .95, and the salt container on which it is snap fitted is blow-molded from blow-molding grade high-density polyethylene having a density of about .96.

A particular feature of the apparatus is the fact that when the cover is disposed at right angles to the flat wall member, the apparatus can be molded in one piece by conventional dual mold techniques. Yet, the structure is free of undersired mold-access spaces which defeat the purposes of the perforated sprinkler. Thus, a relatively inexpensive, simplified, high-speed two-section injection mold, one section approaching in a direction substantially perpendicular to the wall member and the other section approaching from the opposite direction, can be employed.

BRIEF DESCRIPTION OF THE DRAWINGS

The present invention will be more clearly understood from the following detailed description of a specific embodiment, read in conjunction with the accompanying drawings, wherein:

FIG. 1 is a perspective view of a preferred embodiment of the present invention in place on a fragmentally-illustrated salt container, the combination closure and sprinkler being shown in the open position;

FIG. 2 is an enlarged fragmentary perspective view similar to FIG. 1 but from a different direction and with the combination closure and sprinkler being shown in the closed position;

FIG. 3 is a fragmentary overhead plan view of the embodiment of FIG. 1, the combination closure and sprinkler being shown in the open position;

FIG. 4 is a section view along the line 4—4 of FIG. 3;

FIG. 5 is a section view along the line 5—5 of FIG. 3;

FIG. 6 is an enlarged fragmentary overhead plan view with the combination closure and sprinkler in the open position;

FIG. 7 is a section view along the line 7—7 of FIG. 6;

FIG. 8 is a section view along the line 8—8 of FIG. 6 except that the closure is shown in the closed position;

FIG. 9 is a fragmentary bottom plan view of the embodiment of FIGS. 1–8, details of the sprinkler plate and cover being omitted for simplicity and economy of drawing;

FIG. 10 is a fragmentary elevation view in section of another embodiment of the present invention wherein the sprinkler plate is deeply recessed;

FIGS. 11 and 12 are fragmentary overhead plan views showing alternative sprinkler plates for the combination closure and sprinkler of the present invention;

FIG. 13 is a fragmentary sectional plan view of still another sprinkler plate wherein the apertures are funnel shaped; and FIG. 14 is a section view along the line 14—14 of FIG. 13.

DESCRIPTION OF PREFERRED EMBODIMENT

Referring to FIGS. 1 through 5, a preferred embodiment of the plastic container top of the present invention is indicated generally as top member 10 and is mounted, preferably by an internal snap fitting, on vessel 12, such as a cylindrical salt container having a narrowed intermediate waist. While vessel 12 is not, per se, part of the present invention, there are manifestly cooperating and interacting structures between top 10 and vessel 12, as will become apparent hereinafter. For example, as discussed in connection with FIG. 4, top 10 may have a depending flange which engages a depending internal flange on container or vessel 12 to form a snap fitting. While top member 10 is depicted as the whole top for an open-ended container, it may also constitute a plug-type insert or the like with peripheral recesses, grooves or equivalents, which insert is snap fitted into an aperture in the top wall of a container.

The container top 10 comprises wall member 14 which in the illustrated embodiment is substantially flat, except for outwardly and downwardly extending peripheral edge flange 15. Wall member 14 has at least one opening therethrough generally indicated at 16, said opening preferably having at least one straight side 18 (FIGS. 3 and 4) to which cover 20 is integrally molded along a thinned section 22. Straight side 18 is not apparent in FIG. 2 because thinned section 22 is integrally molded therewith presenting an unbroken exterior surface to the viewer.

In a preferred embodiment, wall member 14 may also have a second opening, preferably opposite opening 16, as indicated in dashed lines at 24. In this opening is mounted an integrally formed dispensing spout, the specific structure of which not being, per se, part of the present invention. A preferred form of dispensing spout is disclosed, for example, in a copending application of Albert Yochim, Ser. No. 266,720 filed Oct. 11, 1968, and entitled "Dispensing Apparatus."

As shown in FIG. 4, wall member 14 may be snap fitted to vessel 12 by means of a depending flange 26 which has at its lower extremity an enlarged area or rim 28. During assembly, flange 26 is flexed inwardly slightly as top member 10 is moved coaxially onto vessel 12 until rim 28 resiliently engages the lower extremity of downwardly depending inner edge 30 of vessel 12, which is shown only fragmentarily. Since the particular form of snap fitting is not, per se, the invention, no further description thereof is necessary. Manifestly, wall member 14 could have elongated depending sides which could constitute the walls of the vessel, thus requiring only a bottom fitting or closure. The depending sides could take the form of elongated downward extensions of edge flange 15.

Cover 20 comprises a substantially flat web 32 which is molded in the vertical position shown in FIGS. 1, 3, 4 and 5. Because of thinned section 22, it can be flexed to the closed position shown in FIG. 2 so as to register with opening 16, whereby its upper surface is disposed in coplanar relationship with the upper surface of wall member 14. This facilitates stacking during storage, shipping, and display. Outer edge extremity 34, adjacent the center of cover 20, projects outwardly beyond the recessed edge of wall member 14 as indicated by dashed line 36 in FIG. 3, whereby the underside of the edge of cover 20 can be digitally engaged so as to open the same.

Cover 20 features depending side rails 38 and 40 with outwardly projecting detents 42 and 44, respectively. As will become apparent hereinafter, these rails and detents provide means for releasably securing cover 20 in the closed position. Otherwise, the stresses in thinned section 22 would tend to return cover 20 to the upright, molded position.

Perforated sprinkler plate 46 is integrally molded to the inner surface of wall member 14 and extends substantially across opening 16. It terminates in spaced relation from straight side 18, whereby an access space 48 is provided for mold parts which form the lower extremity of cover 20, including thinned section 22, as those skilled in the molding arts will appreciate. Mold access space 48 has heretofore caused gross leakage problems, which could be coped with heretofore only by configurations requiring multi-section molds having more than opposed dual cavities.

In the present invention this problem is solved by adding to the lower extremity of cover 20 projecting means 50. The externally facing surface of projecting means 50 is curved or rolled so as to roughly approximate the 90° arc through which cover 20 moves when being manipulated from the open position shown in FIGS. 1, 3, 4 and 5 to the closed position shown in FIG. 2. Projecting means 50 can advantageously be molded by the same mold sections which also form cover 20, including thinned section 22, as those skilled in the art will recognize in the light of the present disclosure.

The capability of molding container top 10 in a simple two section injection mold is a particularly advantageous aspect of the present invention. Thus, when cover 20 is in a fully upright position, that is, web 32 is perpendicular to wall member 14, the structure can be molded in its entirety using an injection-type mold, the two sections of which move in opposite vertical directions as viewed in FIG. 4. This is schematically illustrated in FIG. 4 by upper and lower mold sections 52 and 54 which move in the indicated opposed directions. The two mold sections are brought together, the plastic injected, the two mold sections are separated and the resulting container top is readily removed. This avoids the high cost of, and lower production rates associated with, complex multi-section molds. This simplicity of molding is vitally important in meeting the critical low cost requirement.

Conventional molding techniques are employed. For example, one-half degree tapers are provided on vertical surfaces to facilitate removal of the molded structure from the mold. Recesses and the like are sized and configured, e.g., rounded or the like, so that they can be readily flexed or otherwise snapped from the mold. High-speed, multi-cavity molds are used. These and other techniques are well known to those skilled in the molding arts.

Because thinned section 22 is in effect a "memory" hinge, the stresses therein tend to hold the cover 20 in the open position. When cover 20 is flexed to a closed position, it is releasably secured in such position by means of detents 42 and 44 on rails 38 and 40, which engage undersurfaces of recessed portions of wall member 14.

This aspect of the present embodiment is best illustrated in FIGS. 6, 7 and 8. Perforated sprinkler plate 46 has side slots 56 and 58 which receive rails 38 and 40, respectively, when cover 20 is flexed to the closed position. As best seen in FIG. 8, detent 44 is flexed beneath recessed lip 60 on wall member 14. Cover 20 may be readiy opened, even though its upper surface is coplanar with the top surface of wall member 14, by digital manipulation of overhanging outer edge extremity 34 of cover 20. The thickness of rails 38 ad 40 in relation to the width of side slots 56 and 58 may be slightly oversized to provide a frictional fit which supplements or substitutes for detents 42 and 44. Similarly, rails 38 and 40 and/or side slots 56 and 58 may be tapered or otherwise shaped to provide a wedge-like frictional fit, or equivalents thereof.

Side slots 56 and 58 are sufficiently small that the salt dispensed therethrough does not mar the desired sprinkling effect. If desired, however, the salt stream exiting therethrough can be broken up into multiple streams by molding perforated lower webs 62 and 64 on the underside of slots 56 and 58, respectively. The apertures in webs 62 and 64 also permit salt to fall back into the container so that rails 38 and 40 can enter slots 56 and 58 without significant interference. To facilitate the flow of any entrapped salt back into the container from slots 56 and 58, the upper surfaces of webs 62 and 64 may be downwardly curved.

FIG. 7, as well as FIG. 4, illustrates how projecting means 50 effectively seals access space 48. Because projecting means 50 has a curved or rolled surface, it cooperates with inner edge 66 of sprinkler plate 46 so as to effectively block the flow of particulate substances. The gap between edge 66 and projecting means 50 can be adjusted so as to effectively seal and yet not cause binding, as is readily apparent in the light of the present disclosure.

Additional structural strength and rigidity are provided to top 10 by depending transverse flanges 68 and 70, and optional spaced radial ribs 72a, 72b, 72c, etc., as best seen in FIG. 9. Thus, these transverse flanges and ribs, in conjunction with depending flange 26 and peripheral edge flange 15, including edge 74, provide substantial rigidity to the container top, particularly when it is snap fitted to vessel 12. In fact, the combination of dispensing top 10 and container 12 interact to provide a substantially rigid unitary structure even when molded with relatively thin plastic walls, e.g., 25 to 50 mils.

The advantages of the present invention are even more apparent when employing container tops with sprinkler plates which are substantially recessed below the cover, as illustrated in the embodiment of FIG. 10. In this embodiment, sprinkler plate 76 is molded well below the upper surface of wall member 14. This would result in a very wide gap illustrated at 78, which would effectively defeat the purpose of having a sprinkler plate. In this embodiment, gap 78 is effectively sealed by means of projecting means 50 which cooperates with edge 80 on upstanding transverse flange 82 at the inner extremity of sprinkler plate 76.

In this latter embodiment, cover 20 may be releasably retained in the closed position by means of the side rail and detent system already described in connection with the embodiment of FIGS. 1–9. Manifestly, however, no side slots to accommodate side rails on the cover are necessary. The cover may also be retained in a closed position by outward-projecting protuberances on the sides of the rails which engage protuberances or recesses in the side surfaces of opening 16. Various combinations of protuberances and recesses for such purposes will be apparent to those skilled in the art in the light of the present disclosure.

FIGS. 11 through 14 illustrate other embodiments of sprinkler plates which may be employed in connection with the present invention. FIG. 11 shows rectilinear apertures formed by intersecting elongated narrow ribs 84 and 86, which may be molded at the same level or, preferably, at two levels. As illustrated, longer ribs 86 are at the lower level. The two-level arrangement minimizes the area for potential salt entrapment between the undersurface of cover 20 and the upper surface of the sprinkler plate. FIG. 12 is similar to FIG. 11 except that the longer ribs 88 are curved, preferably in a semicircular arrangement, and the shorter ribs 90 are at the lower level.

FIGS. 13 and 14 illustrate frustoconical or funnel shaped cylindrical apertures 92 which also may be employed to substantially minimize the area of the upper surface of the sprinkler plate and thus minimize salt entrapment. They also permit the use of small diameter, widely-spaced apertures without necessarily increasing the area of the upper surface. The funnel-shaped configuration of apertures 92 also assists in channelizing entrapped salt back into the container.

From the above description it is apparent that the objects of the present invention have been achieved. While only certain embodiments have been illustrated, many alternative modifications will be apparent from the above description to those skilled in the art. These and other alternatives are considered within the spirit and scope of the present invention, and coverage thereof is intended by this application.

Having described the invention, what is claimed is:

1. A one-piece molded plastic closure and sprinkler device for particulate materials comprising:
   (a) a wall member having an opening therethrough and securing means adjacent peripheral portions thereof for attachment to another wall portion of a vessel;

(b) a cover for said opening integrally molded in an upstanding position to said wall member along one side of said opening by means of a thinned section, whereby said cover can be hingedly flexed along said thinned section from said upstanding molded position to a closed position;

(c) a perforated plate integrally molded to inner surfaces of said wall member and extending substantially across said opening and terminating in spaced relation from said one side, whereby an access space is provided for mold portions associated with the lower extremity of said cover and the inner surfaces of said thinned section; and (d) projecting means having a curved surface integrally molded to said cover adjacent the lower extremity thereof and extending laterally athwart said access space to cooperate with edgewise portions on said perforated plates so as to substantially seal said access space against granular flow, at least when said cover is in said upstanding molded position, whereby the flow of particulate materials through said opening is substantially limited to the perforations in said perforated plate.

2. The closure and sprinkler device of claim 1 including depending rails on the underside of said cover and registering recesses in said perforated plate, whereby said rails and recesses interfit when said cover is in the closed position.

3. The closure and sprinkler device of claim 1 including projecting detent means on said cover disposed to engage undersurfaces of edge portions of the opening in said wall member so as to releasably secure said cover in a closed position.

4. The closure and sprinkler device of claim 1 wherein portions of said cover project over edges of said wall member whereby said cover can be digitally engaged for opening.

5. The closure and sprinkler device of claim 1 including depending transverse webs on the lower surface of said wall member to add structural strength thereto.

6. The closure and sprinkler device of claim 1 wherein said securing means comprises a depending flange with enlarged engageable surfaces adjacent the lower extremity thereof for snap fitting said device to the open end of a vessel.

7. The closure and sprinkler device of claim 1 molded from high density polyethylene.

8. The closure and sprinkler device of claim 1 wherein substantially all surfaces are engageable by dual mold cavities approaching from two opposite directions when said cover is disposed substantially normally to said wall member.

9. The closure and sprinkler device of claim 1 wherein said wall member is substantially flat and said cover is substantially coplanar therewith when said cover is in the closed position.

10. The closure and sprinkler device of claim 1 wherein said perforated plate is recessed substantially below the upper surface of said wall member and said projecting means cooperates with edgewise portions of an upstanding flange of said perforated plate.

References Cited

UNITED STATES PATENTS

| | | | |
|---|---|---|---|
| 3,185,359 | 5/1965 | Buntic | 222—480 |
| 3,409,188 | 11/1968 | Wright | 222—480 |

STANLEY H. TOLLBERG, Primary Examiner

U.S. Cl. X.R.

222—565

UNITED STATES PATENT OFFICE
CERTIFICATE OF CORRECTION

Patent No. 3,499,588　　　　　　　Dated March 10, 1970

Inventor(s) Benjamin M. Bartilson and Harold E. Trumbull

It is certified that error appears in the above-identified patent and that said Letters Patent are hereby corrected as shown below:

Column 3, line 26, "undersired" should be --undesired--.

Column 4, line 33, "266,720" should be --766,720--.

SIGNED AND
SEALED
JUL 14 1970

(SEAL)
Attest:

Edward M. Fletcher, Jr.
Attesting Officer

WILLIAM E. SCHUYLER, JR.
Commissioner of Patents